US011098593B2

(12) United States Patent
Feldmann

(10) Patent No.: US 11,098,593 B2
(45) Date of Patent: Aug. 24, 2021

(54) ROTOR BLADE FOR A TURBOMACHINE

(71) Applicant: MTU Aero Engines AG, Munich (DE)

(72) Inventor: Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 132 days.

(21) Appl. No.: 16/409,980

(22) Filed: May 13, 2019

(65) Prior Publication Data

US 2020/0024959 A1    Jan. 23, 2020

(30) Foreign Application Priority Data

May 18, 2018  (DE) .......................... 102018207873.4

(51) Int. Cl.
*F01D 5/14*   (2006.01)

(52) U.S. Cl.
CPC .......... *F01D 5/147* (2013.01); *F05D 2240/30* (2013.01); *F05D 2240/55* (2013.01)

(58) Field of Classification Search
CPC .......... F01D 5/081; F01D 5/147; F01D 5/187; F01D 11/008; F05D 2240/80; F05D 2240/81
See application file for complete search history.

(56) References Cited

U.S. PATENT DOCUMENTS

| | | | | |
|---|---|---|---|---|
| 5,415,526 A | * | 5/1995 | Mercadante | ............ F01D 5/081 416/190 |
| 5,924,699 A | * | 7/1999 | Airey | ................... F01D 11/008 277/411 |
| 6,196,799 B1 | | 3/2001 | Fukue et al. | |
| 6,402,471 B1 | * | 6/2002 | Demers | ................... F01D 5/081 416/97 R |
| 8,807,942 B2 | * | 8/2014 | Tibbott | ................... F01D 5/081 416/193 A |
| 9,719,363 B2 | * | 8/2017 | Pack | ..................... F01D 11/008 |
| 2005/0232751 A1 | | 10/2005 | Townes et al. | |
| 2012/0093649 A1 | | 4/2012 | Halfmann et al. | |

(Continued)

FOREIGN PATENT DOCUMENTS

| | | |
|---|---|---|
| EP | 2436879 | 4/2012 |
| FR | 2972759 | 9/2012 |

*Primary Examiner* — Courtney D Heinle
*Assistant Examiner* — Sang K Kim
(74) *Attorney, Agent, or Firm* — Davidson, Davidson & Kappel, LLC

(57) ABSTRACT

A rotor blade for disposition in a hot gas duct of a turbomachine, the rotor blade having an airfoil and an inner platform radially inwardly thereof, the inner platform having a chamber formed therein which is radially outwardly bounded by an inner shroud of the inner platform and is axially bounded between a forward chamber wall and a rearward chamber wall of the inner platform. A forward sealing plate is disposed at the forward chamber wall and extends axially forwardly away from the chamber, and a rearward sealing plate is disposed at the rearward chamber wall and extends axially rearwardly away from the chamber. Furthermore, an axial partition is disposed in the chamber, which axial partition divides the chamber into a radially inner chamber wall region and a radially outer chamber wall region and which, when viewed in an axial cross section, extends into the forward chamber wall at the level of the forward sealing plate and into the rearward chamber wall at the level of the rearward sealing plate.

19 Claims, 3 Drawing Sheets

(56) References Cited

U.S. PATENT DOCUMENTS

2014/0356172 A1\* 12/2014 Sicard .................. F01D 5/06
                                                    416/193 A
2015/0322796 A1   11/2015 Roussely-Rousseau et al.
2016/0215626 A1    7/2016 Chouhan et al.
2017/0370230 A1\* 12/2017 Bahador ............... F01D 5/186

\* cited by examiner

ROTOR BLADE FOR A TURBOMACHINE

This claims the benefit of German Patent Application DE 102018207873.4, filed May 18, 2018 and hereby incorporated by reference herein.

The present invention relates to a rotor blade for disposition in the hot gas duct of a turbomachine.

BACKGROUND

The turbomachine may be, for example, a jet engine, such as a turbofan engine. The turbomachine is functionally divided into a compressor, a combustor and a turbine. In the case of the jet engine, for example, intake air is compressed by the compressor and mixed and burned with jet fuel in the downstream combustor. The resulting hot gas, a mixture of combustion gas and air, flows through the downstream turbine and is expanded therein. The turbine typically has a plurality of stages, each including a stator vane ring and a rotor blade ring downstream thereof. In the various stages, a portion of the energy is removed from the hot gas and converted into rotation of the rotor blade rings (this rotation can then be at least partially used, for example, to drive the compressor).

Typically, the rotor blade rings each have a plurality of rotor blades. Each of the respective rotor blades has a rotor blade airfoil, which is disposed in the hot gas duct and around which the hot gas flows during operation. Radially inwardly thereof, the rotor blade has an inner platform with an inner shroud that bounds the hot gas duct radially inwardly. As is known in the art, the inner platform has a chamber formed therein that is enclosed radially outwardly by the inner shroud and axially between a forward chamber wall and a rearward chamber wall.

SUMMARY OF THE INVENTION

It is an object of the present invention to address the technical problem of providing a particularly advantageous rotor blade.

The present invention provides a rotor blade for disposition in a hot gas duct of a turbomachine, the rotor blade having an airfoil and an inner platform radially inwardly thereof, the inner platform having a chamber formed therein. The chamber that is formed in the inner platform thereof is divided by an axial partition into a radially inner chamber wall region and a radially outer chamber wall region. The axial partition extends between a forward sealing plate disposed at the forward chamber wall and a rearward sealing plate disposed at the rearward chamber wall. Each of the sealing plates is disposed on the side of the respective chamber wall opposite the chamber, and thus the forward sealing plate extends axially forwardly away from the forward chamber wall and the rearward sealing plate extends axially rearwardly away from the rearward chamber wall. In a turbine module, each of the sealing plates, together with an adjoining stator vane ring, may form what is known as a labyrinth seal, and thus seal the hot gas duct radially inwardly (see below for more details).

To this end, during operation, a sealing fluid is injected radially inwardly of the inner platform, whereby, for example, the blade root attachment to the turbine disk is shielded from the high temperatures in the hot gas duct. The hot gas duct is defined radially outwardly of the sealing plates; radially inwardly thereof is disposed the disk edge with the blade mounts, which is traversed by the sealing fluid flow. In accordance with the present invention, the axial partition that bisects the chamber radially inwardly of the inner shroud extends between the forward sealing plate and the rearward sealing plate. Thus, when viewed in axial section, the axial partition extends into the forward chamber wall at the level of the forward sealing plate and into the rearward chamber wall at the level of the rearward sealing plate.

The resulting division of the chamber into the chamber wall regions is advantageous insofar as the outer chamber wall region is, at least for the most part, filled from the hot gas duct through clearance flows, etc., whereas the inner chamber wall region is, for the most part, filled from the sealing air region. The partition prevents significant mixing of the fluids between the chamber wall regions, so that no mixture temperature arises. The hot gas flows substantially only into the outer chamber wall region, and from there returns into the hot gas duct. Conversely, this means that hardly any hot gas gets into the disk edge region, which reduces heating of the parts and components there. Accordingly, thermal expansions in the disk edge region can also be reduced. Consequently, this makes it possible, for example, to limit gap formation between, for example, a static seal and a rotor.

Preferred embodiments will be apparent from the entire disclosure. In the description of the features, a distinction is not always drawn specifically between device, method and use aspects. In any case, the disclosure should be read to imply all claim categories. In particular, the explanations regarding the rotor blade also refer to a turbine module and corresponding operating methods.

In general, the terms "axial" and "axial direction" refer to the axis of rotation about which the rotor blade rotates during operation and which coincides, for example, with the longitudinal axis of the turbomachine or turbine module. The terms "radial" and "circumferential" as well as the corresponding directions also refer thereto. The terms "inwardly" and "outwardly" refer to radial directions, unless expressly stated otherwise. The terms "forward" and "rearward" refer to an axial succession (with "forward" meaning upstream and "rearward" meaning downstream relative to the flow of hot gas).

The axial partition may divide the chamber into the chamber wall regions either alone or together with other elements, for example with a stiffening rib or a damper and the mount thereof. As viewed in axial section, the partition has an extent in the axial direction, but not necessarily exclusively. If the forward and rearward sealing plates are radially offset with respect to each other, it may even be preferred for the extent to have a radial component. Insofar as reference is generally made to an "axial section" or "axial cross section," this refers to a sectional plane containing the axis of rotation.

In a preferred embodiment, when viewed in an axial cross section, the partition extends into the rearward chamber wall in such a way that a rearward extension of the axial partition in the region of the chamber wall has an overlap with the rearward sealing plate, the latter being taken to include possible fillet radii with which it merges radially inwardly and/or radially outwardly into the chamber wall. Thus, the radial extent of the sealing plate is measured up to the ends of the run-outs of the fillet radii; i.e., the run-outs of the radially outer and radially inner fillet radii (with which the sealing plate merges into the chamber wall). The rearward extension of the partition is compared to this, and, figuratively speaking, the partition is for this purpose shown as being continued into the chamber wall. Then, there should be at least one overlap at or in the chamber wall. The extension is formed in the direction of extent of the partition; i.e., for example, obliquely to the axis of rotation if the partition extends obliquely to the axis of rotation. In general, the direction of extent is taken along a centerline of the partition, which centerline, as viewed in axial section, lies in the middle of the partition.

The overlap in the region of the rearward chamber wall may be advantageous with respect to flow guidance, and thus may help reduce or prevent inflow of hot gas into the disk edge region. This is true not only at the rearward chamber wall and the rearward sealing plate, but analogously also at the forward chamber wall, which will be discussed hereinafter.

In a preferred embodiment, when viewed in an axial cross section, the axial partition extends into the forward chamber wall in such a way that its extension overlaps there with the forward sealing plate. Analogously to the explanations regarding the rearward sealing plate, the forward sealing plate is considered to include possible fillet radii; i.e., it is measured up to the ends of the run-outs of the radially inner and radially outer fillet radii of the forward sealing plate (with which the latter merges into the forward chamber wall).

In a preferred embodiment, when viewed in axial section, the axial partition extends in a straight line between the forward chamber wall and the rearward chamber wall. Thus, the axial partition is obtained as the shortest possible connecting line between the forward and rearward sealing plates. Depending on the radial positions of the sealing plates, the axial partition may be oblique to the longitudinal axis (and thus "in a straight line" does not necessarily mean "axially parallel"). In general, however, a straight-line extent is not mandatory. Rather, the partition may extend with (a) curvature(s) and/or (a) kink(s), as seen in axial section.

In a preferred embodiment, the axial partition is integrally formed as a single piece with the remainder of the rotor blade, for example cast together therewith. However, a casting is not mandatory. A unitary design can also be obtained in the case of additive manufacturing, for example.

In an alternative preferred embodiment, the axial partition is inserted as a separate part in the chamber. To this end, the chamber may have, for example, retaining fingers disposed therein by which the partition is supported against centrifugal force. For example, in the case of a cast blade, the multipiece, i.e., inserted or laid-in, partition, may facilitate casting. The partition may be made of, for example, sheet metal and inserted into the chamber.

In any case, in a preferred embodiment, a portion of the forward sealing plate is disposed radially inwardly of the rearward sealing plate. Preferably, the entire forward sealing plate is offset radially inwardly. In general, the forward sealing plate is offset radially inwardly from the inner shroud, and specifically a forward portion thereof (transition to the forward chamber wall). Similarly, the rearward sealing plate is offset radially inwardly from the inner shroud, and specifically a rearward portion thereof (transition to the rearward chamber wall).

The present invention also relates to a turbine module having a rotor blade as disclosed herein. The rotor blade is then part of a rotor blade ring which preferably has a plurality of identically constructed rotor blades arranged in rotational symmetry. In general, the rotor blade has a blade root for attachment to the rotor disk, the blade root being located radially inwardly of the inner platform. The blade root may be shaped, for example, like a fir tree when viewed in the axial direction, and may then be form-fittingly held in a complementary blade root receptacle of the rotor disk, which is not specifically relevant to the present subject matter.

In a preferred embodiment of the turbine module, the rearward sealing plate of the rotor blade is disposed radially between an inner platform of a subsequent (downstream) stator vane and a sealing fin of the associated stator vane ring. Depending on the specific design, this sealing fin may be disposed, for example, on a radially extending seal carrier wall which is led by a spoke centering means over the stator vanes and which, on the other hand, carries a seal, e.g., a honeycomb seal, radially inwardly toward the rotor. This is for purposes of illustration; what is relevant to the present subject matter is rather the arrangement of the rearward sealing plate between the sealing fin and the inner platform of the stator vane (also referred to as "fish mouth seal"), and thus the interaction as a labyrinth seal.

In a preferred embodiment, the forward sealing plate, together with a preceding (upstream) stator vane ring, forms a fish mouth seal since it is disposed radially between the inner platform of the upstream stator vane and a sealing fin of the upstream stator vane ring.

The present invention also relates to a method for operating a turbine module as disclosed herein. In such method, the outer chamber wall region is filled with hot gas from the hot gas duct, and the inner chamber wall region is filled with sealing fluid from the disk edge region. This is accomplished, for example, through gaps between circumferentially adjacent rotor blades or the inner platforms thereof. While more efficient sealing could be achieved using additional seals or undercuts, thereby reducing the clearance flow per se, this would add additional complexity and cost. Therefore, it is not necessarily the aim of the present approach to completely prevent clearance flows, but to substantially eliminate their detrimental effect on the disk edge region by means of the axial partition.

In a preferred embodiment, a pressure develops in each of the inner and outer chamber wall regions during operation, the value of the pressure in the inner chamber wall region differing no more than 20% from that of the pressure in the outer chamber wall region. Further advantageous upper limit values (positive/negative) are no more than 15%, 10% or 5% (with increasing preference in the order given). Preferably, the pressures are substantially equal in magnitude, so that there is hardly any exchange between the inner and outer chamber wall regions.

The present invention also relates to the use of a rotor blade as disclosed herein in a corresponding method.

BRIEF DESCRIPTION OF THE DRAWINGS

The present invention will now be described in more detail with reference to an exemplary embodiment. The individual features may also be essential to the invention in other combinations within the scope of the other independent claims, and, as above, no distinction is specifically made between different claim categories.

In the drawing.

DETAILED DESCRIPTION

Figure 1:
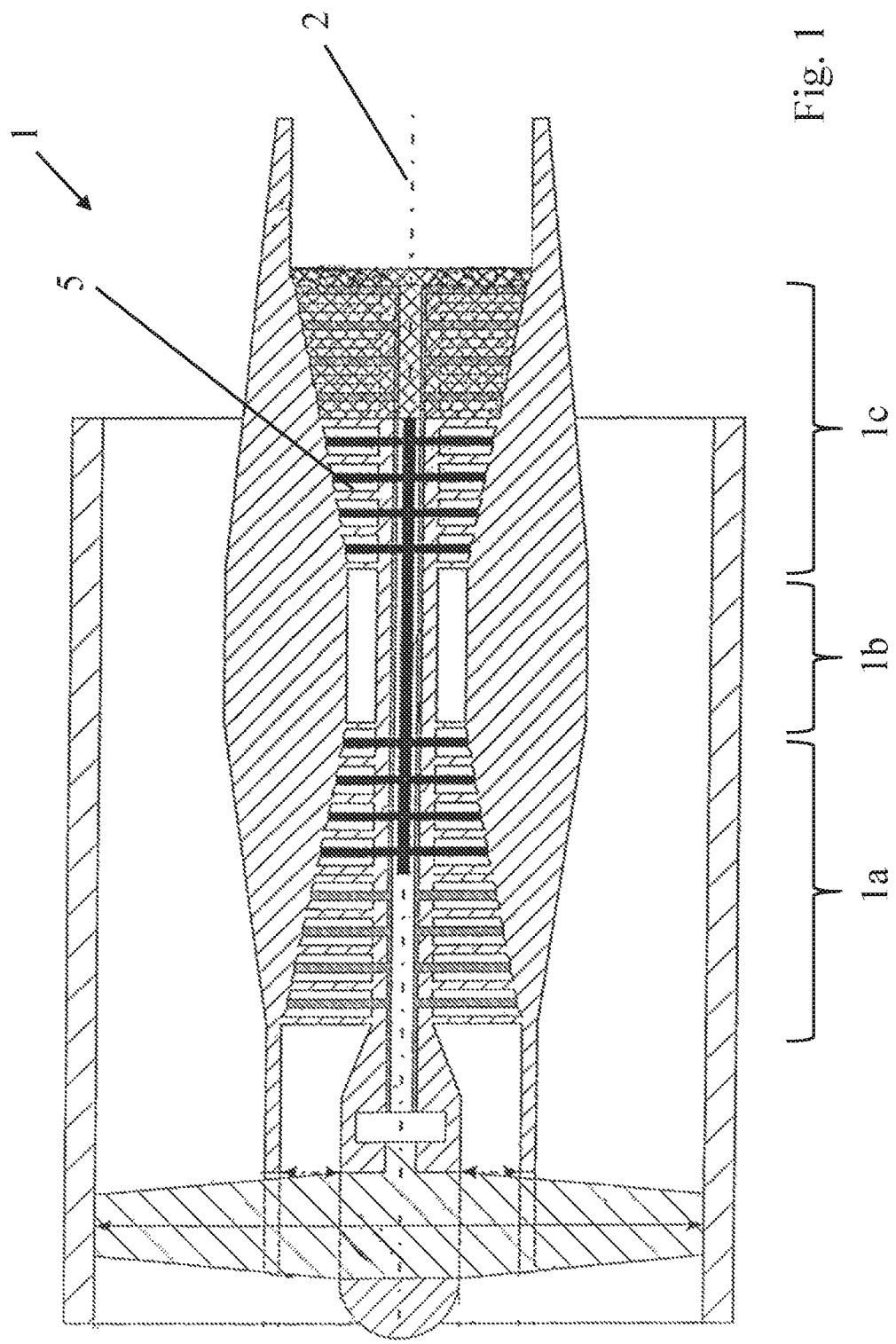
FIG. 1 shows an axial cross-sectional view of a jet engine.

FIG. 1 shows in axial section a turbomachine 1, specifically a turbofan engine. Turbomachine 1 is functionally divided into a compressor 1a, a combustor 1b and a turbine 1c. Both compressor 1a and turbine 1c are each made up of plurality of stages. Each of the stages is composed of a stator vane ring and a subsequent rotor blade ring. The intake air is compressed in compressor 1a, and is then mixed and burned with jet fuel in the downstream combustor 1b. The hot gas flows through hot gas duct 5, thereby driving the rotor blade rings that rotate about axis of rotation 2.

Figure 2:
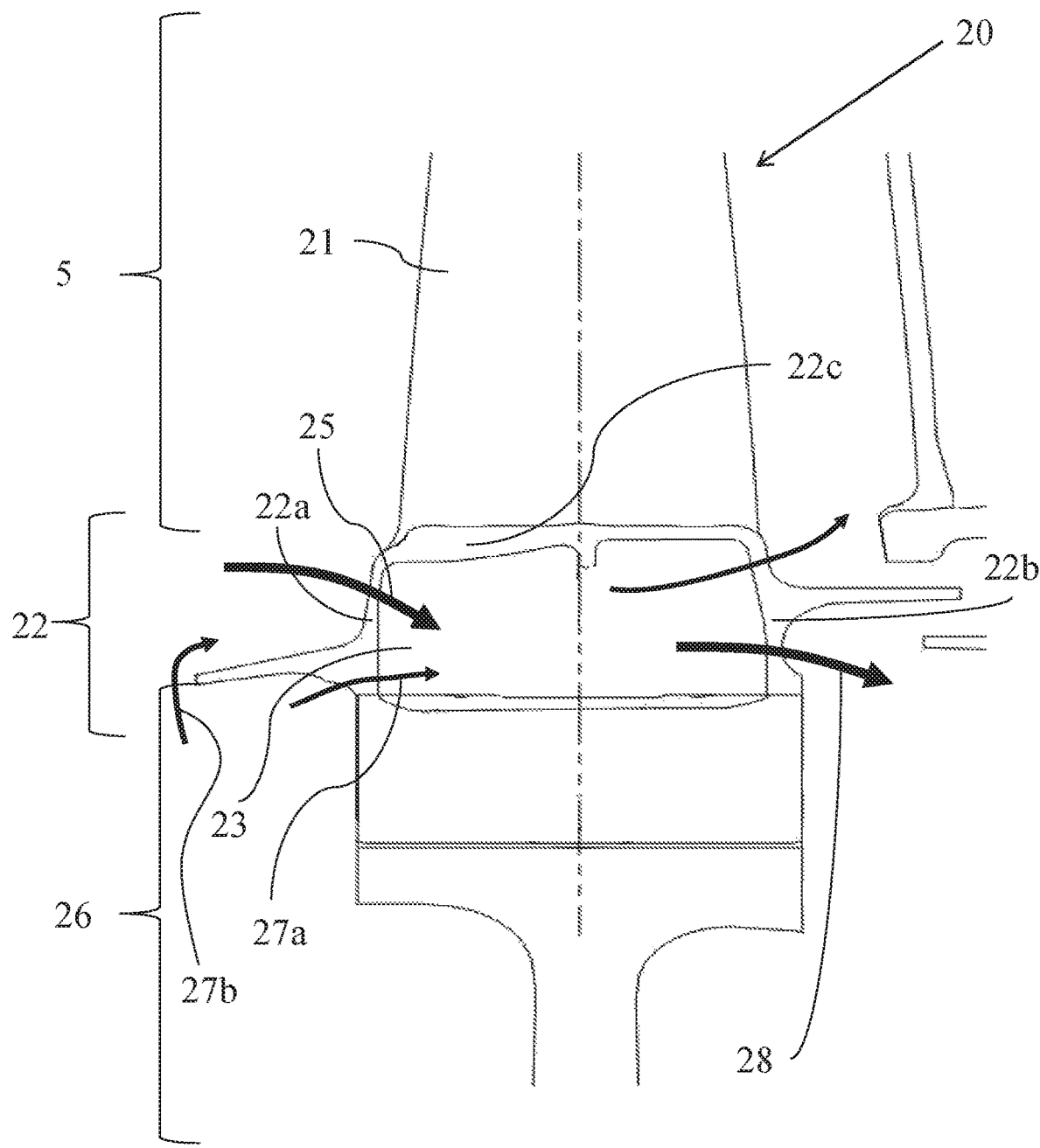
FIG. 2 shows, for purposes of illustration, a non-inventive rotor blade without an axial partition.

FIG. 2 shows a rotor blade 20 having an airfoil 21 around which the hot gas flows during operation. Radially inwardly thereof, rotor blade 20 has an inner platform 22 that has a chamber 23 formed therein. This chamber 23 is axially bounded by a forward chamber wall 22a and a rearward chamber wall 22b and radially outwardly bordered by inner shroud 22c.

During operation, hot gas 25 flows from hot gas duct 5 into chamber 23. At the same time, a sealing fluid 27 (compressor air) flows from a disk edge region 26 into chamber 23 (specifically, a portion 27a thereof flows into chamber 23 and another portion 27b flows around the forward sealing plate). Sealing fluid 27 is intended to shield disk edge region 26 from hot gas duct 5 (see below for more details). In chamber 23, the sealing fluid mixes with the inflowing hot gas 25, producing a mixture temperature that is higher than that of the sealing fluid. Correspondingly, a fluid 28, a mixture of hot gas and sealing fluid, flowing out of chamber 23 into the rearward disk edge region has an increased temperature. This causes heating of the downstream parts and components in the rotor edge region, which may result, for example, in greater thermal expansions and correspondingly larger gaps and thus leakages.

Figure 3:
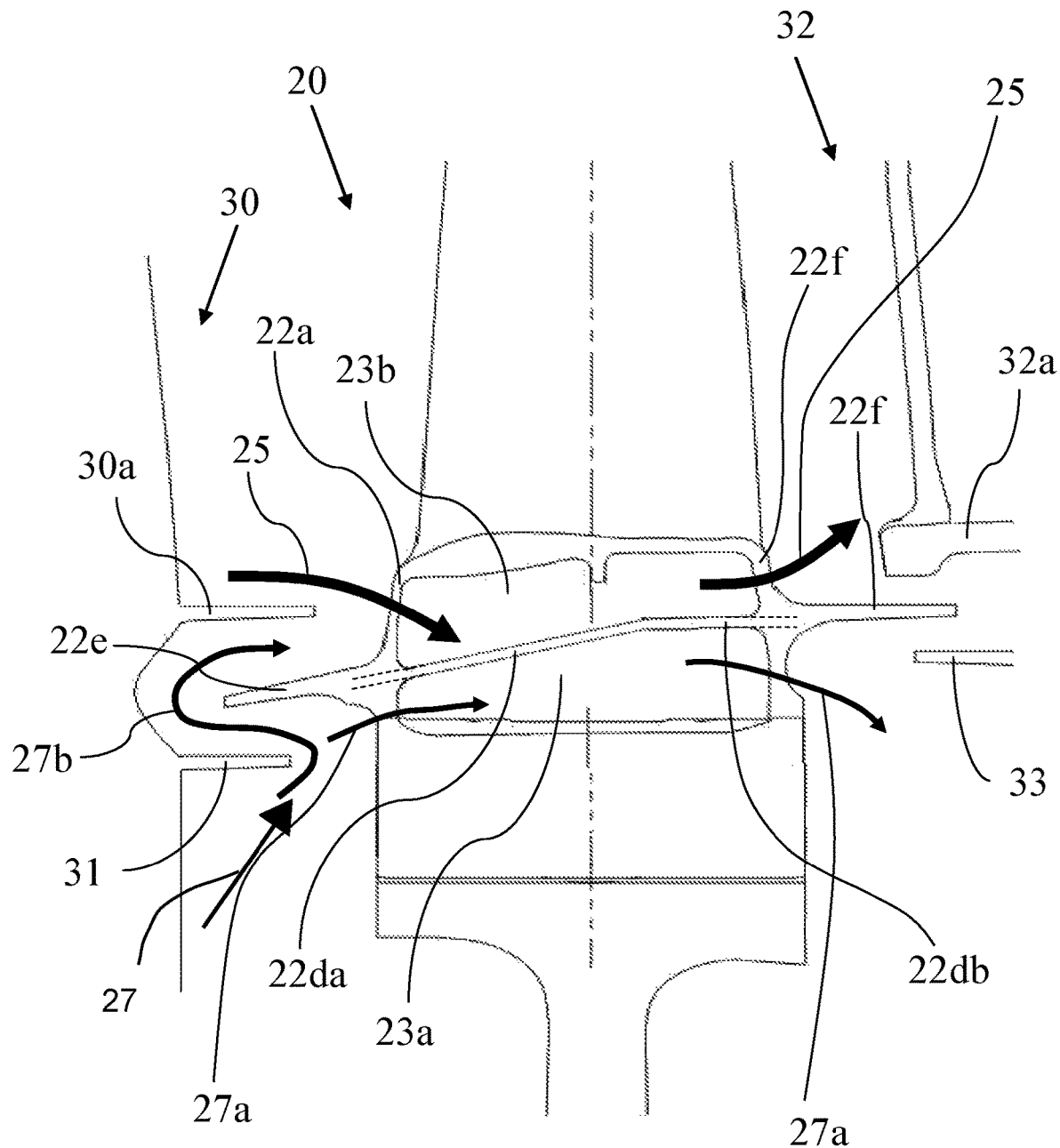
FIG. 3 shows an inventive rotor blade having an axial partition radially inwardly of the inner shroud.

FIG. 3 shows an inventive rotor blade 20 whose basic design is, in principle, comparable to that of a rotor blade according to FIG. 2. Parts of identical or comparable function are indicated by the same reference numerals and reference is made to the description of FIG. 2. In contrast, chamber 23 is bisected by an axial partition 22d, namely into a radially inner chamber wall region 23a and a radially outer chamber wall region 23b. Axial partition 22d extends between a forward sealing plate 22e and a rearward sealing plate 22f.

Forward sealing plate 22e, an inner platform 30a of an upstream stator vane 30 and a sealing fin 31 of the remainder of the stator vane ring together form a labyrinth seal. Likewise, rearward sealing plate 22f, an inner platform 32a of the downstream stator vane 32 and a sealing fin 33 of the associated stator vane ring together form a labyrinth seal. With these labyrinth seals and the sealing fluid 27 injected radially inwardly thereof, disk edge region 26 is shielded from hot gas duct 5.

Since the axial partition is located at the level of sealing plates 22e, f, outer chamber wall region 23b is filled substantially exclusively with hot gas 25 from hot gas duct 5. In contrast, inner chamber wall region 23a is filled substantially exclusively with sealing fluid 27. The hot gas 25 from the outer chamber wall region 23b then returns into hot gas duct 5, while sealing fluid 27 flows into disk edge region 26. This prevents mixing, and thus an increase in the sealing fluid temperature, which is advantageous with respect to gap stability etc. in disk edge region 26.

Specifically, axial partition 22d is shaped such that extensions thereof (indicated in dashed lines), which each extend into a respective chamber wall, have an overlap with the fillets of the respective sealing plate 22e, f.

LIST OF REFERENCE NUMERALS turbomachine 1
  compressor 1a
  combustor 1b
  turbine 1c
axis of rotation 2
hot gas duct 5
rotor blade 20
airfoil 21
inner platform 22
  forward chamber wall 22a
  rearward chamber wall 22b
  inner shroud 22c
  axial partition 22d
    forward portion 22da
    rearward portion 22db
  forward sealing plate 22e
  rearward sealing plate 22f
chamber 23
  inner chamber wall region 23a
  outer chamber wall region 23b
hot gas 25
disk edge region 26
sealing fluid 27
  portion flowing through the chamber 27a
  portion flowing around the sealing plate 27b
  fluid 28
  upstream stator vane 30
    inner platform 30a
  sealing fin 31
downstream stator vane 32
  inner platform 32a
sealing fin 33

What is claimed is:

1. A rotor blade for disposition in a hot gas duct of a turbomachine, the rotor blade comprising:
   an airfoil;
   an inner platform radially inwardly of the airfoil, the inner platform having a chamber formed in the platform, the chamber being radially outwardly bounded by an inner shroud of the inner platform and axially bounded between a forward chamber wall and a rearward chamber wall of the inner platform;
   a forward sealing plate disposed at the forward chamber wall extending axially forwardly away from the chamber;
   a rearward sealing plate disposed at the rearward chamber wall extending axially rearwardly away from the chamber; and
   an axial partition disposed in the chamber, the axial partition dividing the chamber into a radially inner chamber wall region and a radially outer chamber wall region, the axial partition when viewed in an axial cross section, extending into the forward chamber wall at a forward sealing plate level and into the rearward chamber wall at a rearward sealing plate level;
   wherein, the axial partition has a rear upper planar surface defining a rear upper plane and a rear lower planar surface defining a rear lower plane, the rearward sealing plate, without consideration of any fillet, extending at least partially between the rear upper plane and the rear lower plane at a side of the rearward chamber wall opposite the axial partition.

2. The rotor blade as recited in claim 1, wherein the rear upper plane enters the rearward sealing plate away from any fillet.

3. The rotor blade as recited in claim 2 wherein the rearward sealing plate has a fillet on a radially inner side, the rear lower plane overlapping with the fillet.

4. The rotor blade as recited claim 1, wherein, when viewed in an axial cross section, the axial partition extends into the forward chamber wall in such a way that, at the forward chamber wall, the axial partition has a front upper planar surface defining a front upper plane and a front lower planar surface defining a front lower plane, the forward sealing plate, without consideration of any fillet, extending at least partially between the front upper plane and the front lower plane at a side of the forward chamber wall opposite the axial partition.

5. The rotor blade as recited in claim 4 wherein the forward sealing plate has a fillet on a radially inner side, the lower front plane entering the forward sealing plate through the fillet.

6. The rotor blade as recited in claim 4 wherein the front upper plane and the rear upper plane are angled with respect to each other.

7. The rotor blade as recited in claim 1 wherein the axial partition is inserted as a separate part in the chamber.

8. The rotor blade as recited in claim 1 wherein a portion of the forward sealing plate is disposed radially inwardly of the rearward sealing plate.

9. A turbine module comprising the rotor blade as recited in claim 1.

10. The turbine module as recited in claim 9 wherein a rotor blade ring, on which the rotor blade is disposed, is disposed upstream of a downstream stator vane ring having a downstream stator vane, the rearward sealing plate of the rotor blade being disposed radially between a downstream stator vane inner platform and a sealing fin of the downstream stator vane ring.

11. The turbine module as recited in claim 9 wherein a rotor blade ring, on which the rotor blade is disposed, is disposed downstream of an upstream stator vane ring having an upstream stator vane, the upstream sealing plate of the rotor blade being disposed radially between an upstream stator vane inner platform and a sealing fin of the upstream stator vane ring.

12. The rotor blade as recited in claim 1 wherein, when viewed in the axial cross section, the axial partition is bent between the forward chamber wall and the rearward chamber wall.

13. The rotor blade as recited in claim 1 wherein the axial partition is integrally formed as a single piece with the remainder of the rotor blade.

14. A method for operating a turbine module as recited in claim 9 comprising flowing hot gas from the hot gas duct of the turbomachine into a radially outer chamber wall region of the rotor blade, and flowing a sealing fluid from a disk edge region into the radially inner chamber wall region.

15. The method as recited in claim 14 wherein a value of a pressure developing in the radially inner chamber wall region differs no more than 20% from that of a pressure developing in the radially outer chamber wall region.

16. A method for using the rotor blade as recited in claim 1 comprising flowing hot gas from the hot gas duct of the turbomachine into a radially outer chamber wall region of the rotor blade, and flowing a sealing fluid from a disk edge region into the radially inner chamber wall region.

17. A rotor blade for disposition in a hot gas duct of a turbomachine, the rotor blade comprising:
an airfoil;
an inner platform radially inwardly of the airfoil, the inner platform having a chamber formed in the platform, the chamber being radially outwardly bounded by an inner shroud of the inner platform and axially bounded between a forward chamber wall and a rearward chamber wall of the inner platform;
a forward sealing plate disposed at the forward chamber wall extending axially forwardly away from the chamber;
a rearward sealing plate disposed at the rearward chamber wall extending axially rearwardly away from the chamber; and
an axial partition disposed in the chamber, the axial partition dividing the chamber into a radially inner chamber wall region and a radially outer chamber wall region, the axial partition when viewed in an axial cross section, extending into the forward chamber wall at a forward sealing plate level and into the rearward chamber wall at a rearward sealing plate level;
wherein, when viewed in the axial cross section, the axial partition has a front upper planar surface defining a front upper plane and a front lower planar surface defining a front lower plane, the forward sealing plate, without consideration of any fillet, extending at least partially between the front upper plane and the front lower plane at a side of the forward chamber wall opposite the axial partition.

18. A rotor blade for disposition in a hot gas duct of a turbomachine, the rotor blade comprising:
an airfoil;
an inner platform radially inwardly of the airfoil, the inner platform having a chamber formed in the platform, the chamber being radially outwardly bounded by an inner shroud of the inner platform and axially bounded between a forward chamber wall and a rearward chamber wall of the inner platform;
a forward sealing plate disposed at the forward chamber wall extending axially forwardly away from the chamber;
a rearward sealing plate disposed at the rearward chamber wall extending axially rearwardly away from the chamber; and
an axial partition disposed in the chamber, the axial partition dividing the chamber into a radially inner chamber wall region and a radially outer chamber wall region, the axial partition when viewed in an axial cross section, extending into the forward chamber wall at a forward sealing plate level and into the rearward chamber wall at a rearward sealing plate level;
wherein, when viewed in the axial cross section, the axial partition is connected to the forward chamber wall at a different level than the rearward chamber wall to accommodate different levels of the forward and rearward sealing plates.

19. The rotor blade as recited in claim 18 wherein, when viewed in the axial cross section, the axial partition is bent between the forward chamber wall and the rearward chamber wall.

* * * * *